United States Patent [19]

Masclet

[11] 4,138,164

[45] Feb. 6, 1979

[54] APPARATUS FOR ADJUSTING BRAKING FORCES ON VEHICLE WHEELS AS A FUNCTION OF DECELERATION AND ACCELERATION OF THE BRAKED WHEELS

[75] Inventor: Jean Masclet, Paris, France

[73] Assignee: Messer-Hispano, Montrouge, France

[21] Appl. No.: 868,462

[22] Filed: Jan. 10, 1978

Related U.S. Application Data

[63] Continuation of Ser. No. 565,253, Apr. 4, 1975, abandoned.

[30] Foreign Application Priority Data

Apr. 12, 1974 [FR] France .............................. 74 13045

[51] Int. Cl.$^2$ .............................................. B60T 8/08
[52] U.S. Cl. ............................. 303/105; 188/181 A; 244/111
[58] Field of Search .................... 188/181 A; 244/111; 303/20, 97, 100, 105, 106, 110, 111; 324/162, 166; 340/53, 62; 361/238

[56] References Cited

U.S. PATENT DOCUMENTS

| | | | |
|---|---|---|---|
| 3,245,727 | 4/1966 | Anderson et al. | 188/181 A X |
| 3,552,803 | 1/1971 | Lucien | 303/105 |
| 3,608,979 | 9/1971 | Coyle | 303/111 |
| 3,615,120 | 10/1971 | Yamazaki et al. | 303/105 |
| 3,834,770 | 9/1974 | Fleischer et al. | 303/106 |
| 3,861,756 | 1/1975 | Arikawa | 303/106 |
| 3,936,941 | 2/1976 | Hiscox | 303/105 |

*Primary Examiner*—Stephen G. Kunin
*Attorney, Agent, or Firm*—Haseltine, Lake, & Waters

[57] ABSTRACT

Apparatus for adjusting the braking force of brakes applied to vehicle wheels wherein the brakes are operated in on-off manner as a function of the deceleration or acceleration of the wheels. For a given braking signal the braking force is eliminated when the deceleration of the braked wheel exceeds a predetermined threshold value and the reapplication of the braking force is delayed for a period of time proportional to the magnitude and duration of deceleration of the wheel and inversely proportional to subsequent acceleration of the wheel when such acceleration exceeds a predetermined threshold.

6 Claims, 3 Drawing Figures

APPARATUS FOR ADJUSTING BRAKING FORCES ON VEHICLE WHEELS AS A FUNCTION OF DECELERATION AND ACCELERATION OF THE BRAKED WHEELS

CROSS RELATED APPLICATION

This application is a continuation of Ser. No. 565,253 filed Apr. 4, 1975, now abandoned.

The invention relates to a method and system for adjusting braking forces and applicable to various types of vehicles such as, for example automobiles and in particular aircraft.

A particular object of the invention is to provide a braking-force controller of simple design and high reliability which corrects the amount of braking force as a function of deceleration and acceleration of the braked vehicle wheels so that, if because of the adherence of the wheel, the braking couple or moment resulting from an amount of braking force is less than the permitted couple, deceleration of the wheel and that of the vehicle are lower than the triggering threshold of the controller, and the latter does not intervene.

On the other hand, if the braking couple is greater than the permitted couple, the wheel starts to skid with considerable deceleration, and the controller then disengages the brake and the wheel can pick up speed.

This controller must also take into account adherence conditions during the time when the wheel is starting to turn again so that, for example, for a considerable deceleration of the wheel followed by slight acceleration, the braking couple is reapplied only after a lengthy delay; on the other hand if acceleration is considerable, that is to say if the wheel starts to turn again rapidly, the braking couple is reapplied after a very short time.

Consequently, the method in accordance with the invention consists mainly in controlling the braking members or the brakes as a function of the deceleration or the acceleration of each of the braked vehicle wheels in such manner that, on the one hand, for a given amount of braking force, braking is suppressed when the deceleration of the braked wheel passes a threshold (which may occur for example when the wheel starts to skid freely) and, on the other hand, reapplication of the braking force is delayed in a manner proportional to the amount of deceleration of the wheel and inversely proportionally to acceleration during the time that it gathers speed again, and this for an acceleration value greater than a threshold for permitting it to gather speed again whatever the extent of the adherence of the wheel to the ground.

An embodiment of the invention will now be described, by way of non-limiting example, with reference to the annexed drawings in which.

Figure 1:
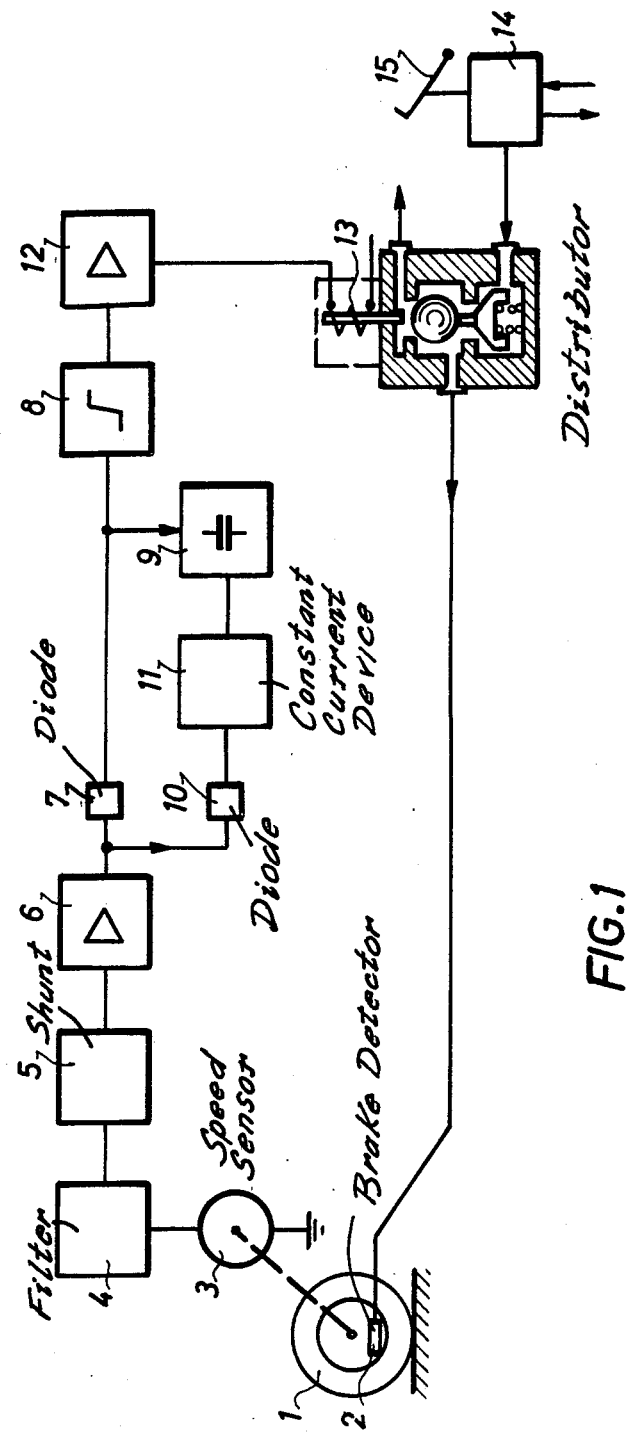
FIG. 1 is a block diagram of the system for adjusting braking force in accordance with the invention.

Referring to FIG. 1, a braked wheel 1, provided with a brake 2, drives a device 3 for electrically measuring its speed. This signal is transmitted to a filter circuit 4, the purpose of which is to eliminate extraneous noise. The signal from the filter circuit 4 is transmitted to a shunting device 5 which provides a shunted signal in relation to the period of the signal for the speed of the wheel 1. This shunted signal is amplified in a variable-gain amplifier 6 as a function of frequency so as to reduce the signals from the vibrations of the wheel and from the means by which it is secured to the vehicle. The output of this amplifier is connected, through a diode 7 which only lets through deceleration signals, to a threshold device 8 which sends a control signal to the coil of an electric valve 13 by way of a power amplifier 12 when the shunted signal is greater than the threshold of the device 8; the signal from the diode 7 is also sent to a memory 9.

Through a diode 10 which only lets through the acceleration signals, the shunted signal from the block 6 controls, during the acceleration stage of the wheel, the discharge of the memory by way of a constant-current device 11, this taking place beyond an acceleration threshold value.

From a distributor 14 the electric valve 13 receives the braking pressure controlled by a braking pedal 15, and transmits it to the brake 2 when the coil is not energized.

Thus, the vehicle being at a given speed, following a braking signal controlled by the pedal 15, the pressure delivered by the distributor 14 is transmitted to the brake 2 since the electric valve 13 is not energized.

This pressure produces a braking force which applied a braking couple or moment on the wheel which causes deceleration $\gamma$ in the wheel 1.

If, because of the adherence of the wheel to the ground, the braking couple is less than the permitted couple, the deceleration of the wheel corresponds to that of the vehicle and is less than the triggering threshold of the element 8. Consequently the system does not come into action.

On the other hand, if the braking couple is greater than the permitted couple, the wheel starts to skid with considerable deceleration.

The signal that enters the threshold device 8 is then greater than the threshold value, and the coil of the electric valve 13 is energized by the power amplifier 12. The hydraulic pressure in the brake decreases, and the wheel is allowed to pick up speed again.

The memory 9 stores the final deceleration value (which value is taken at the moment when the threshold value is passed). When the wheel 1 starts turning again, the output signal from the amplifier 6 changes its sign, but the electric valve 13 remains energized by the discharge from the memory.

To take into account adherence conditions during the time when the wheel is picking up speed again, the acceleration signal obtained at the output of the diode 10 will short-circuit the memory 9, beyond a threshold value $\gamma s$ (see FIG. 2), by means of the discharge device 11, and this will occur proportionally to the amount of acceleration of the wheel. Thus, for considerable deceleration followed by slight acceleration, the memory will take a long time to discharge, and the pressure will be reapplied to the brake 2 only after a lengthy delay. On the other hand, if acceleration is considerable, that is to say if the wheel starts to pick up speed again rapidly, the memory will discharge rapidly through the discharge device 11, and the pressure will be reapplied to the brake after a very short time.

Furthermore, if deceleration is slight, that is to say if the wheel has not skidded over a great distance, the memory is not charged to any great extent, and its discharge will occupy only a short time. Pressure will then be rapidly reapplied to the brake.

The required function is thus achieved, and the wheel will have time to pick up speed in all cases where adherence to the ground occurs.

Figure 2:
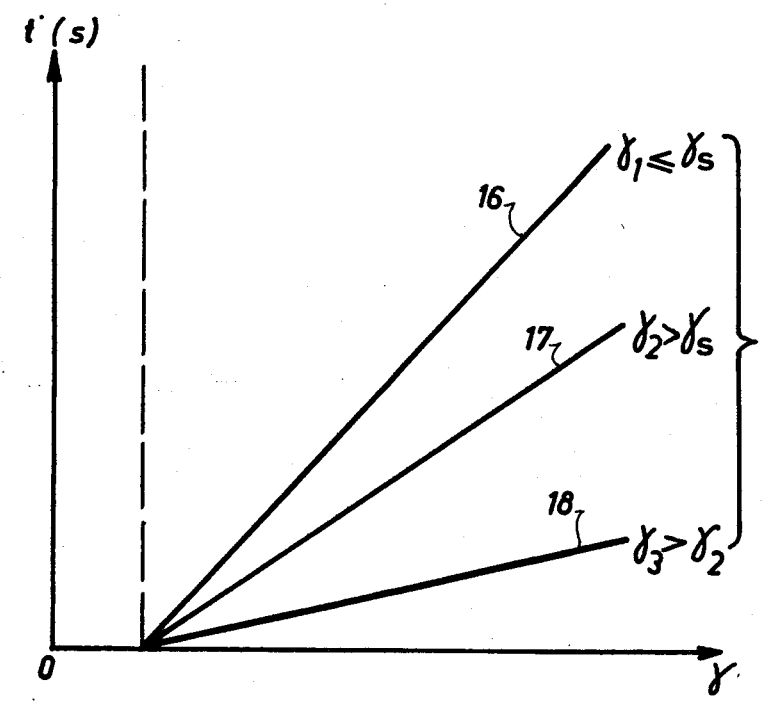
FIG. 2 is a graph showing the variation in delay period as a function of deceleration, for various acceleration values.

Referring to FIG. 2, the curve 16 represents the change in the delay period as a function of deceleration $\gamma$ for an acceleration value $\gamma_1$ which is less than or equal to the threshold value $\gamma s$ for acceleration. It will be seen that because the discharge of the memory is carried out using constant current, this curve 16 is a straight line which originates at the time t = 0, for the deceleration threshold value.

It will be clear that the times taken by the memory to dischrge (delay value), in the case of the curve 16, are greater for the same deceleration value than are the discharge times represented by the delay curve 17 for which acceleration $\gamma_2$ is greater than the acceleration threshold value $\gamma s$.

In a similar manner, the times required by the memory to discharge, represented by the delay curve 17, are always greater, for the same deceleration value, than those represented by the curve 18 for which the acceleration $\gamma_3$ is greater than the acceleration $\gamma_2$.

Figure 3:
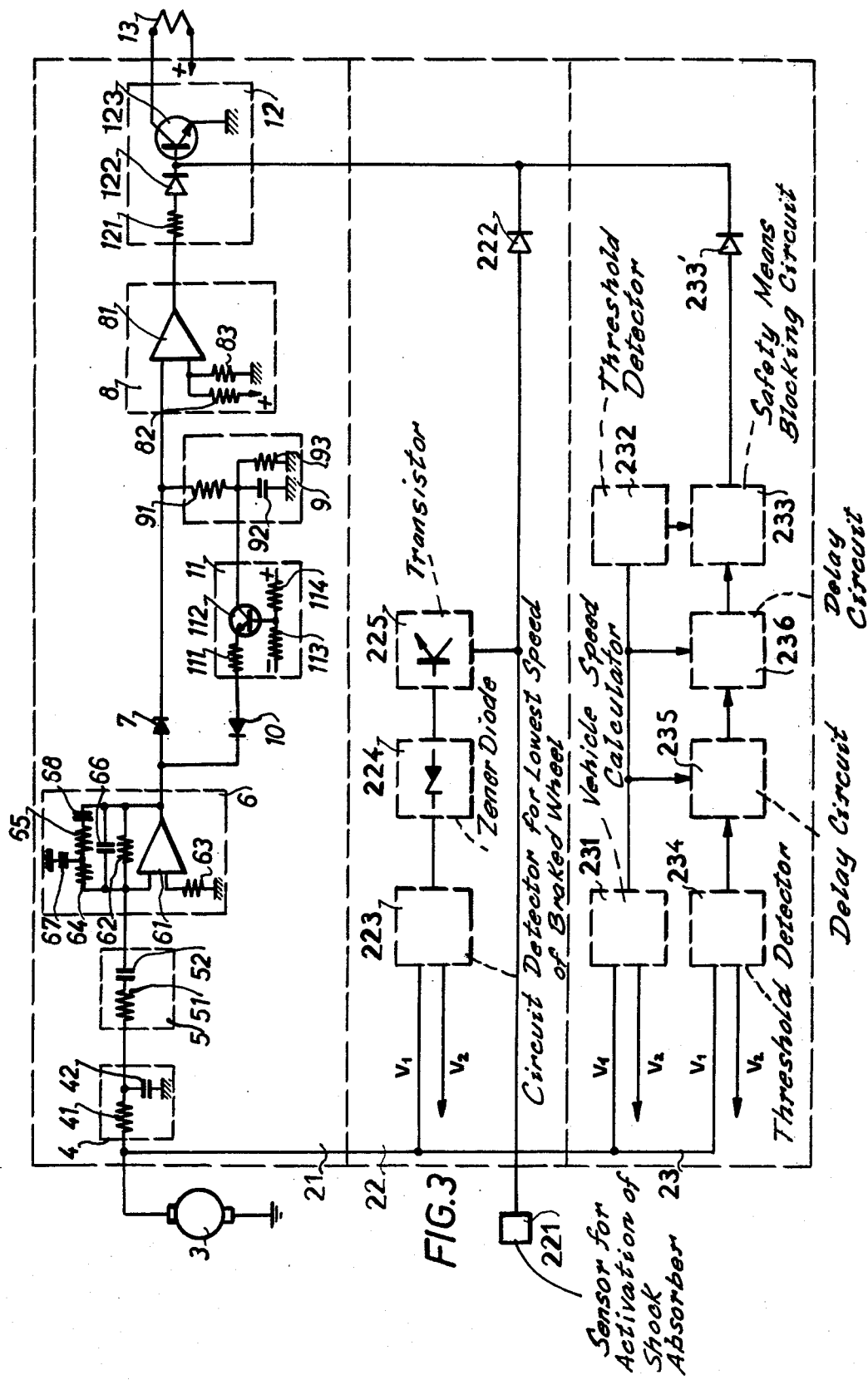
FIG. 3 is a general diagram of a system for adjusting braking force associated, on the one hand, with an impact safety device and, on the other hand, with a safety device for preventing locking of the braked wheels.

Referring to FIG. 3 which illustrates the application of the method of the invention in a vehicle having two wheels the braking of which is controlled, the adjusting system comprises an independent adjusting circuit for each wheel, and common safety elements. FIG. 3 shows only one of the two circuits associated with each of the two wheels, the second circuit being identical. This circuit comprises a tachogenerator 3 associated with the wheel, a network containing the previously mentioned components 4, 5, 6, 7, 8, 9, 10, 11 and 12, and the corresponding electric valve 13. This circuit may optionally also comprise an impact safety circuit 22 and an anti-locking safety circuit 23 ensuring complete disengagement of the brakes from the wheels whenever the vehicle is not in contact with the ground as when a wheel is locked inopportunely. For each of the wheels, the signal from the tachogenerator 3 is filtered in the block 4 by a series resistor 41 and a capacitor 42 connected to ground. The output voltage is passed to a shunting device 5 constituted by a resistor 51 and a capacitor 52 arranged in series. The shunted signal then enters an amplifier 6 having a gain variable as a function of frequency and constituted by an operational amplifier 61 counter-acted by a resistor 62. The second input of the operational amplifier 61 is connected to ground through a resistor 63.

A counter-action circuit, constituted by resistors 64 and 65 and capacitors 66, 67 and 68 enables the gain with frequency to be adjusted so as to attenuate the frequencies corresponding to the vibrations of the wheel and the means whereby it is secured to the vehicle.

The output signal from the amplifier 61 is passed successively:
through the diode 7 to a threshold-detection circuit 8 constituted by an operational amplifier 81, fitted as a comparator, the second input receiving a positive potential defining the threshold value through a resistance bridge 82 and 83 fitted between ground and a positive voltage source;
through the same diode 7 to a memory circuit 9 comprising a charging resistor 91, a memory capacitor 92 and a discharging resistor 93;
through the diode 10 to a circuit 11 for discharging the memory capacitor 92 and constituted by a series resistor 111 and a current-control transistor 112, the base of which is polarized by the resistance bridge 113 and 114 determining a threshold below which this circuit does not operate. The emitter of this transistor 112 is connected to the resistor 111 whereas its collector is connected to the memory capacitor 92 to ensure its discharge proportional to the acceleration of the wheel.

The output signal from the threshold-detecting circuit 8 controls a power amplifier 12 which comprises, in series, a resistor 121 and a diode 122 connected to the base of a power transistor 123, of which the collector is connected to the coil of the electric valve 13.

Thus, when the wheel starts to skid, the voltage delivered by the generator decreases thus creating a positive signal proportional to the deceleration, at the output of the amplifier 6.

At the output of the diode 7, this signal is compared with the threshold voltage within the block 8; if this signal is greater than said threshold voltage, the block 8 sends a signal which triggers the transistor 123 thus ensuring that current passes into the coil of the electric switch.

The deceleration signal passing through the charging resistor 91 will charge the memory capacitor 92 proportionally to the value of the signal as well as to its duration, thus ensuring that the electric valve 13 continues to be energized after cessation of the deceleration signal.

With the brake disengaged from the wheel, the latter picks up speed and produces an acceleration signal at the output from the block 6, which signal, by way of the diode 10, the resistor 111 and the transistor 112, causes discharge of the memory proportionally to the acceleration value, and when the voltage passed into the memory drops below the threshold voltage of the block 8, suppresses the signal for energizing the coil of the electric valve 13, this consequently taking place after a variable period permitting the wheel to pick up speed again.

The adjusting system illustrated in FIG. 3 also comprises an impact safety device, known per se, and used on aircraft, which device in particular prevents braking from taking place as long as the vehicle has not made contact with the landing path. For this purpose a contact 221, associated with the means whereby the braked wheel is secured to its vehicle, indicates whether its shock-absorber is compressed or not. The signal, produced when the shock-absorber is not compressed, is sent through diodes 22 2 to power amplifiers 12 in each adjusting circuit, thus ensuring that the coils 13 of the electric valves are energized and therefore that it is not possible to apply pressure to the brakes. Furthermore, a circuit 223, which detects the lowest speed of the braked wheels, short-circuits, through a Zener diode threshold detector 224 and a transistor 225, the signal sent through the shock-absorber contact, and thus makes it possible to apply the brakes if the wheels of the vehicle are caused to rotate even if the shock-absorbers are not compressed.

This is necessary since, in the case of an aircraft, the vehicle, because of lift, may already be in contact with the landing path when the shock-absorbers are not compressed.

The control cabinet may also contain a safety means 23 for preventing locking of the braked wheels and known per se.

The circuit is only active when the speed of the vehicle is greater than a given speed V, so as to permit braking at low speed as well as when the vehicle is stopped.

When the circuit is active and if one of the braked wheels is at a speed lower than the reference speed $V_1$, the circuit ensures that the brake is disengaged from this wheel and from the wheel disposed symmetrically therewith, in order to maintain the direction of travel of the vehicle.

The speed of the vehicle is calculated in the block 231 by taking the greatest of the speeds of the braked wheels, this signal being stored and released in the event of simultaneous locking of all the wheels following deceleration in excess of the maximum that the vehicle can reach in the optimum wheel-to-ground adherence conditions. This enables safety to be maintained when all the wheels are locked simultaneously which would result in a zero vehicle-speed signal and thus in the safety system going out of operation if there were no memory.

The vehicle-speed signal provided by the block 231 enters a threshold detector 232 which sends a signal to a prohibiting system 233 which blocks the operation of the safety means when the speed of the vehicle is less than V.

The speed signals supplied by tachogenerators 3 also pass into a threshold detector 234 which, when one of the signals is less than the speed $V_1$, sends a brake-disengagement signal to the power amplifiers of the corresponding control circuits through the block 233 and a diode 233'.

When the wheel picks up speed again and its speed again exceeds $V_1$, the brake-disengagement signal is suppressed, but after a delay (block 236) proportional to the speed of the vehicle so as to enable the wheel to reach synchronous speed before further skidding is caused.

Finally, a circuit 235 for delaying the triggering of the safety circuit, operative at low vehicle speeds, enables this safety means to be used only intentionally, in view of the fact that at speeds slightly higher than the reference speed V, it is possible for a wheel speed to drop below $V_1$ without there being a fault in the adjusting system, the delay making it possible to check whether the wheel picks up speed as a result of intervention by the adjusting system, before causing the safety means to operate.

It will be noted that the transmission of control signals from the circuits 22 and 23 to the block 12 occurs between the diode 122 and the power transistor 123.

Thus, the system for adjusting braking power in accordance with the invention is clearly distinguished from the known systems, which are generally more complex and specific to a particular type of use and which in particular employ impedance circuits which may comprise a plurality of capacitors, one of which is automatically variable with the acceleration signal. Furthermore, in these known systems, there is no question of an acceleration threshold or deceleration threshold being involved.

Finally, it may be stated that this system provides a number of advantages stemming mainly from its simplicity and from the elements of which it is made up; examples of such advantages are robustness, reliability, freedom from contamination etc.

I claim:

1. A system of adjusting the braking force of brakes applied to a vehicle wheel, based on the deceleration and acceleration of the wheels of the vehicle during braking, comprising an element which provides a signal which is a function of the speed of each of the wheels; a shunt device receiving this signal; a diode which only passes deceleration signals connected to said shunt device; a threshold device connected to said diode for passing a control signal, means connected to said threshold device for receiving said control signal for controlling the disengagement of the brake from the corresponding wheel and operating on an all-or-nothing basis, in the case of exaggerated skidding; means including a second diode connected in parallel with the first diode and only passing acceleration signals therethrough, a memory, and a memory discharger connected in series; the signal derived from said shunting device being transmitted, during the subsequent acceleration stage of the wheel when the brake is released, through said second diode which only lets the acceleration signals pass therethrough, to said memory discharger which discharges said memory beyond a predetermined acceleration threshold in inverse proportion to the magnitude of acceleration; a charging resistor between the memory and said first diode such that the deceleration signal is passed to the memory through said charging resistor to obtain a charge which is proportional both to the value of the signal and its duration, said memory discharger including a transistor which operates on constant current, a resistor connecting the second diode to the emitter of said transistor, a resistance bridge connected to the base of the transistor for polarization thereof, said transistor being controlled by the magnitude of acceleration of the wheel when it is picking up speed, when beyond the threshold defined by the polarization of the base of said transistor, said threshold device comprising a comparator, one of the two inputs of which is polarized by a reference voltage, from a voltage-dividing bridge connected between ground and a constant voltage source, the other input of the comparator being connected to said first diode and the charging resistor.

2. A system according to claim 1, which comprises, between the element that supplies a signal as a function of the speed of each of the wheels, and the shunting device, an element for filtering extraneous noise from said signal.

3. A system according to claim 1, wherein the shunting device is provided with an amplifier having a gain which varies as a function of frequency, and which permits the system to operate without interference from vibrations caused by displacement of the braked wheel.

4. A system according to claim 1 wherein at the output of the threshold device for the deceleration signals, the element controlling the disengagement of the brake consists of a resistor followed by a diode connected to the base of a power transistor, and a control winding of an electric valve connected to said power transistor to disengage the brake.

5. A system according to claim 4, particularly for use on aircraft, which comprises an impact safety device, connected to said element for measuring wheel speed and to the base of the power transistor for controlling the coil of the electric valve and rendering the same operative and the brakes disengaged as long as the vehicle is not in contact with the landing path.

6. A system according to claim 4 which comprises a safety device for preventing locking of the braked wheels, which device ensures that the wheels can pick up speed, when one or more of them is locked inopportunely during braking, and passes a control signal to the base of said power transistor, said device being connected to said element for measuring wheel speed and to the base of said power transistor.

* * * * *